United States Patent
Yang

(10) Patent No.: US 12,095,612 B2
(45) Date of Patent: Sep. 17, 2024

(54) NETWORK RESOURCE ACCESS INTERMEDIARY SYSTEM BASED ON RESOURCE PLUG-INS AND PROCESSING METHOD THEREFOR

(71) Applicant: Hangzhou Jindoutengyun Technologies Co., Ltd., Zhejiang Province (CN)

(72) Inventor: Yang Yang, Zhejiang Province (CN)

(73) Assignee: Hangzhou Jindoutengyun Technologies Co., Ltd., Hangzhou (CN)

( * ) Notice: Subject to any disclaimer, the term of this patent is extended or adjusted under 35 U.S.C. 154(b) by 0 days.

(21) Appl. No.: 17/652,708

(22) Filed: Feb. 28, 2022

(65) Prior Publication Data

US 2022/0278895 A1 Sep. 1, 2022

(30) Foreign Application Priority Data

Mar. 1, 2021 (CN) .......................... 202110223526.6

(51) Int. Cl.
*H04L 41/0806* (2022.01)
*G06F 9/445* (2018.01)

(52) U.S. Cl.
CPC ...... *H04L 41/0809* (2013.01); *G06F 9/44526* (2013.01)

(58) Field of Classification Search
CPC . H04L 41/0809; H04L 67/10; H04L 41/0806; H04L 67/02; H04L 67/34;
(Continued)

(56) References Cited

U.S. PATENT DOCUMENTS

| | | | |
|---|---|---|---|
| 7,392,546 B2* | 6/2008 | Patrick | G06F 21/6245 709/219 |
| 8,990,956 B2* | 3/2015 | Leber | G06Q 50/01 713/182 |

(Continued)

FOREIGN PATENT DOCUMENTS

| CN | 102811230 A | 12/2012 |
|---|---|---|
| CN | 112202824 A | 1/2021 |

*Primary Examiner* — Ninos Donabed
(74) *Attorney, Agent, or Firm* — Proi Intellectual Property US

(57) ABSTRACT

The disclosure relates to a network resource access intermediary system based on resource plug-ins and a processing method therefor. The network resource access intermediary system based on resource plug-ins comprises an access intermediary base module and a resource plug-in in a communication connection with the access intermediary base module, wherein the access intermediary base module is used for receiving a resource access request, selecting a corresponding resource plug-in according to a target resource corresponding to the resource access request, and accessing the target resource through the selected resource plug-in; and the resource plug-in is adaptable to the target resource to complete access to the target resource. The workload of adapting an access intermediary to new resources is reduced for access intermediary developers, and an access intermediary that has been deployed and is in continuous operation can be upgraded and updated without affecting existing resource access.

1 Claim, 2 Drawing Sheets

(58) Field of Classification Search
CPC .... G06F 9/44526; G06F 8/65; G06F 9/44505; G06F 8/61; G06F 9/451
See application file for complete search history.

(56) References Cited

U.S. PATENT DOCUMENTS

| | | | | |
|---|---|---|---|---|
| 9,465,697 | B2* | 10/2016 | Robinson | G06F 11/1458 |
| 2002/0091702 | A1* | 7/2002 | Mullins | G06F 16/25 |
| 2003/0208505 | A1* | 11/2003 | Mullins | G06F 16/289 |
| | | | | 707/999.102 |
| 2004/0123048 | A1* | 6/2004 | Mullins | G06F 12/0815 |
| | | | | 711/141 |
| 2007/0244980 | A1* | 10/2007 | Baker, III | G06Q 10/107 |
| | | | | 709/207 |
| 2012/0079383 | A1* | 3/2012 | Thanumalayan | G06F 9/44526 |
| | | | | 715/716 |
| 2014/0173417 | A1* | 6/2014 | He | G06F 40/123 |
| | | | | 715/234 |
| 2014/0235357 | A1* | 8/2014 | Liao | H04L 67/1051 |
| | | | | 463/42 |
| 2015/0026237 | A1* | 1/2015 | Kaplinger | H04L 67/01 |
| | | | | 709/203 |
| 2015/0213723 | A1* | 7/2015 | Vattikonda | H04L 67/02 |
| | | | | 434/322 |
| 2016/0188421 | A1* | 6/2016 | Karinta | G06F 16/188 |
| | | | | 707/654 |
| 2018/0288137 | A1* | 10/2018 | Veeramani | H04L 67/34 |
| 2021/0374263 | A1* | 12/2021 | Maycotte | G06F 16/25 |
| 2022/0067858 | A1* | 3/2022 | Nadler | G06Q 50/18 |

* cited by examiner

NETWORK RESOURCE ACCESS INTERMEDIARY SYSTEM BASED ON RESOURCE PLUG-INS AND PROCESSING METHOD THEREFOR

BACKGROUND OF THE INVENTION

1. Technical Field

The invention relates to the technical field of network resource access, in particular to a network resource access intermediary system based on resource plug-ins and a processing method therefor

2. Description of Related Art

To protect network resources and access to the network resources, an access intermediary such as a resource gateway is often deployed, so that users can access a network resource by means of a user terminal via the access intermediary (as shown in FIG. 1). The access intermediary processes a resource access request and then transmits the processed resource request to a target resource, processes a response returned by the target resource and then transmits the processed response to the user terminal, so that an access conversation to the network resource is completed. When users cannot access the target resource via a current access intermediary (for example, when the target resource is a new type of resource, the current access intermediary is unable to adapt to this new type of resource), the entire access intermediary needs to be upgraded and updated to adapt to the new type of resource, as shown in FIG. 2. To upgrade or update the entire access intermediary, the developer of the access intermediary has to spend a plenty of labor and time to upgrade the entire access intermediary to make the access intermediary adapt to the new type of resource and also has to carry out a comprehensive test; moreover, if the access intermediary has been deployed and is in continuous operation, the workload of upgrading and updating the access intermediary will be extremely large, existing resource access may be affected during the upgrading and updating process, and users may be unable to access resources, that are accessible before upgrading, via the upgraded or updated access intermediary due to software bugs.

BRIEF SUMMARY OF THE INVENTION

In view of the above-mentioned problems, the objective of the invention is to provide a network resource access intermediary system based on resource plug-ins to reduce the workload of adapting an access intermediary to new resources for access intermediary developers and to upgrade and update an access intermediary, that has been deployed and is in continuous operation, without affecting existing resource access.

The invention further provides a processing method for a network resource access intermediary system.

To fulfill the above objective, the invention is implemented through the following technical solution:

In one aspect of the invention, a network resource access intermediary system based on resource plug-ins comprises an access intermediary base module and a resource plug-in in a communication connection with the access intermediary base module, wherein:

The access intermediary base module is used for receiving a resource access request, selecting a corresponding resource plug-in according to a target resource corresponding to the resource access request, and accessing the target resource through the selected resource plug-in, and is also used for acquiring a response returned by the target resource from the resource plug-in and correspondingly generating a response to a user terminal;

The resource plug-in is used for adapting to and accessing the target resource and receiving a response returned by the target resource.

Preferably, the access intermediary base module comprises:

A resource information manager used for updating an accessible resource list and resource plug-ins corresponding to resources in the accessible resource list; and An access processor used for receiving the resource access request, selecting the resource plug-in corresponding to the target resource according to the target resource corresponding to the resource access request, a current accessible resource list and a corresponding relationship between resources and resource plug-ins, and accessing the target resource through the selected resource plug-in.

Preferably, the resource plug-in comprises a resource access module, which is in a communication connection with the access intermediary base module through a base module interface and is adaptable to the target resource to realize resource access.

Preferably, the access intermediary system further comprises:

A resource plug-in manager which is in a communication connection with the resource information manager, and is used for configuring and deploying a new resource plug-in, different from the existing plug-in, for the access intermediary system and sending information indicating that the new resource plug-in has been deployed to the resource information manager.

Preferably, configuring and deploying a new resource plug-in, different from the existing plug-ins, for the access intermediary system specifically comprises:

Acquiring, by the resource plug-in manager, the new resource plug-in from a resource plug-in library according to a request sent from the resource information manager, and configuring and deploying the new resource plug-in;

Or, generating, by the resource plug-in manager, the new resource plug-in according to a request sent from the resource information manager, and configuring and deploying the new resource plug-in.

Preferably,

The resource plug-in is also used for receiving and presenting the response returned by the target resource;

The access intermediary base module is also used for acquiring represented information from the resource plug-in, generating information of an image code format, and sending the information of the image code format to the user terminal as response information.

In another aspect of the invention, a processing method for a network resource access intermediary system, comprises:

Receiving a resource access request, selecting a corresponding resource plug-in according to a target resource corresponding to the resource access request to adapt to the target resource, and accessing the target resource through the selected resource plug-in.

Preferably, selecting a corresponding resource plug-in according to a target resource corresponding to the resource access request specifically comprises:

Selecting the resource plug-in corresponding to the target resource according to the target resource corresponding to the resource access request, a current accessible resource list and a corresponding relationship between resources and resource plug-ins.

Preferably, the processing method further comprises:

Receiving a response returned by the target resource, correspondingly generating a response to a user terminal, and transmitting the response to the user terminal.

The invention has the following beneficial effects:

1. According to the invention, different resource plug-ins are deployed for different resources based on the access intermediary base module to form a new access intermediary system structure; when accessing a new target resource (such as a fourth target resource of a new type, a resource plug-in adaptable to the fourth target resource is not available in a current access intermediary system, so it is impossible to access the fourth target resource through the current access intermediary system), users just need to additionally deploy a resource plug-in adaptable to the new target resource (such as a fourth resource plug-in) to establish an access channel between the access intermediary base module and the target resource. Thus, compared with a solution of updating an entire access intermediary in the prior art, the transformation and workload are small, updating is easy, normal access to original resources will not be affected, and the adaptability and stability of the system are better under the precondition that user experience is guaranteed.

2. When users simultaneously access multiple resources, the resources use corresponding resource plug-ins respectively and are isolated from each other, so that data leakage and security problems caused by resource sharing and data crossover are effectively prevented.

3. Processing requiring a large quantity of computations such as graphics rendering related to resources to be accessed by users is completed by the network access intermediary system, so that the requirements for the performance of user terminals and for resources are low.

4. The resource plug-ins are adaptable to users, user terminals and target resources, so that user experience is guaranteed.

5. User terminals do not directly interact with target resources, so that the target network resources are protected against attacks from the user terminals, data leakage is prevented, and the user terminals are protected against damage caused by malicious contents from the target resources.

DETAILED DESCRIPTION OF THE INVENTION

To better clarify the purposes, technical solutions and advantages of the embodiments of the invention, the technical solutions of the embodiments of the invention will be clearly and completely described. Obviously, the embodiments in the following description are merely illustrative ones, and are not all possible ones of the invention. All other embodiments obtained by those ordinarily skilled in the art without creative labor should also fall within the protection scope of the invention.

The invention adopts a new network resource access intermediary system structure, which deploys different resource plug-ins (which are environmental conditions, variables and dependencies necessary for resource access, are provided by an access intermediary system, a resource provider or a third party, and can be loaded and released dynamically) for different resources based on an access intermediary base module, so that users can access corresponding resources through the access intermediary base module and the resource plug-ins; and when accessing a new target resource, users just need to additionally deploy a resource plug-in adaptable to the new target resource, so that the transformation and workload are small, updating is easy, and normal access to original resources will not be affected.

Figure 1:
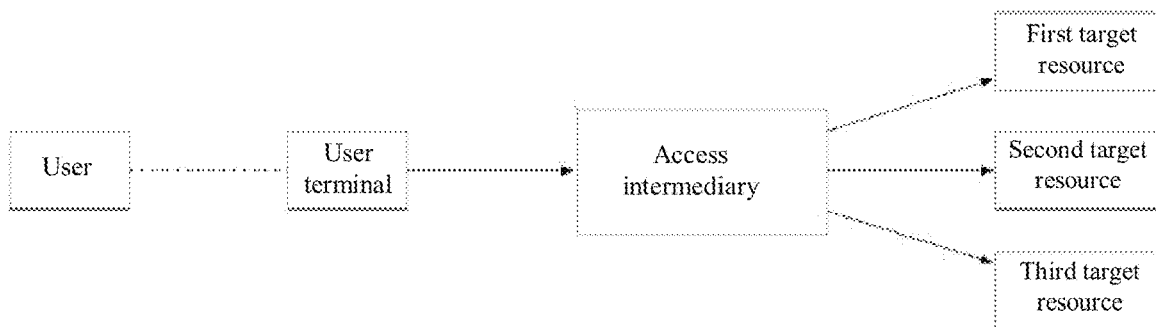
FIG. 1 is a structural diagram of a network resource access method based on an access intermediary in the prior art of the invention.
Figure 2:
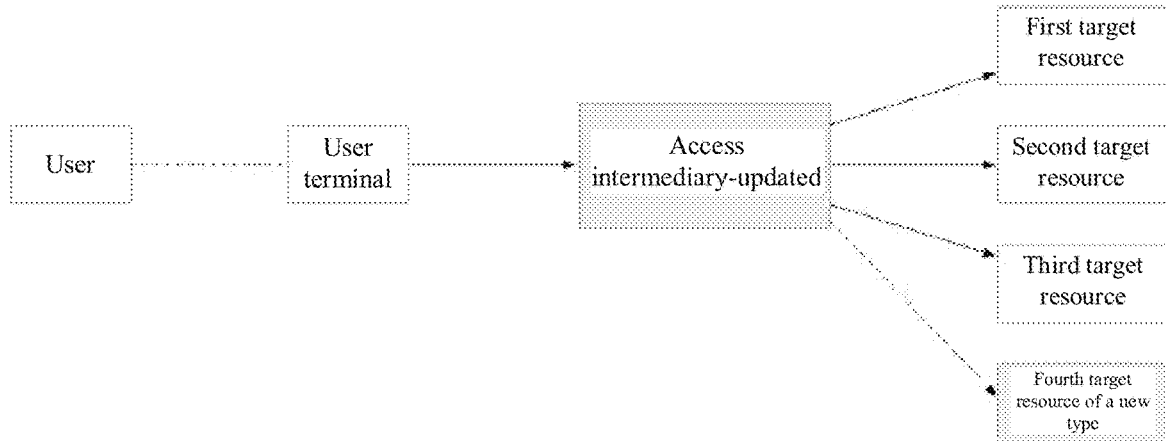
FIG. 2 is a structural diagram of the structure shown in FIG. 1 for adaption to a new resource.
Figure 3:
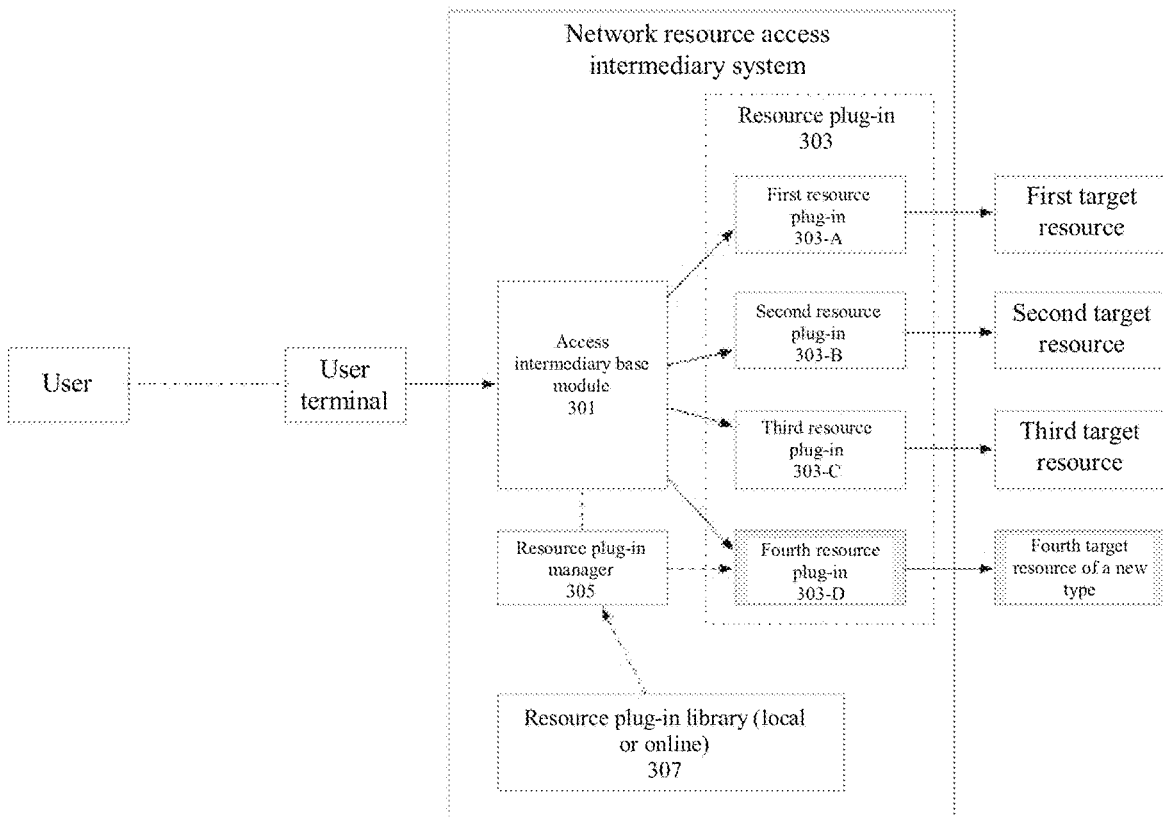
FIG. 3 is a framework diagram of a network resource access intermediary system of the invention.

As shown in FIG. 3, this embodiment provides a network resource access intermediary system based on resource plug-ins, comprising an access intermediary base module 301 and a resource plug-in 303 in a communication connection with the access intermediary base module 301.

Figure 4:
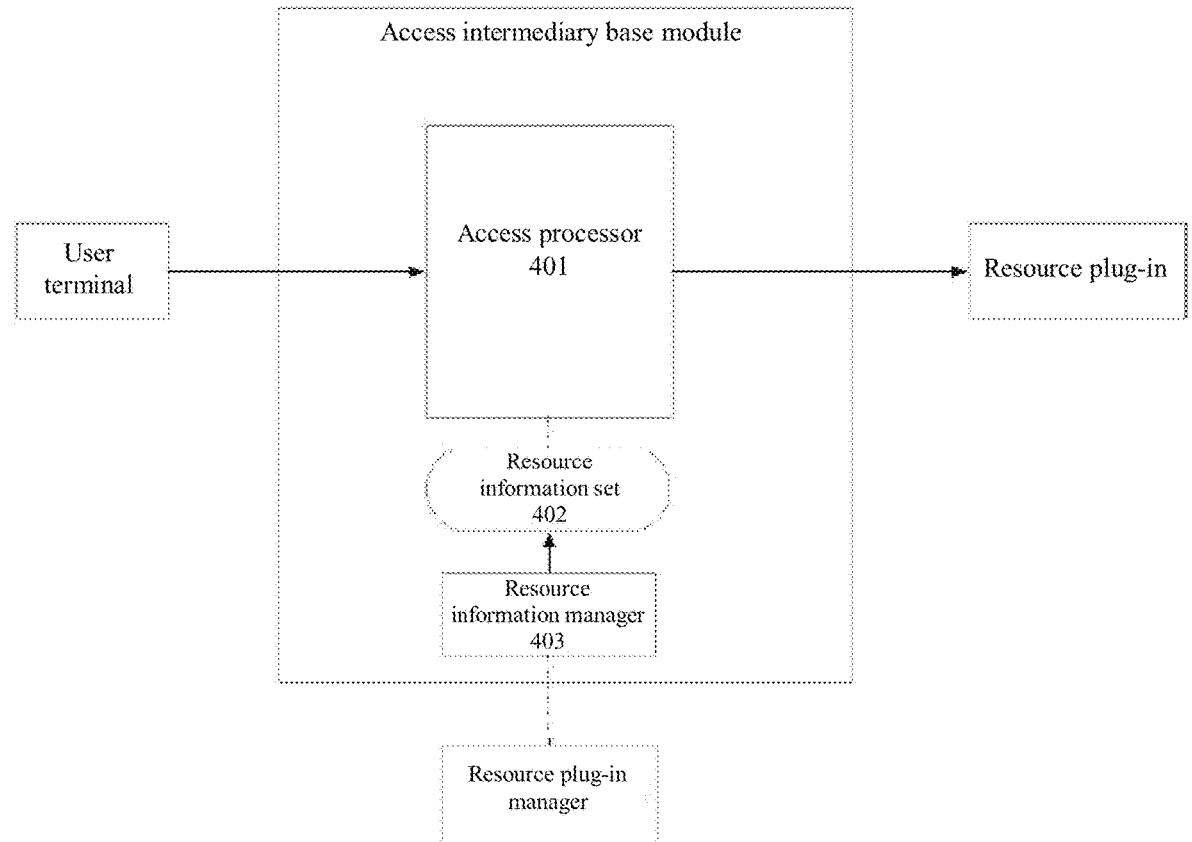
FIG. 4 is a detail diagram of an access intermediary base module of the network resource access intermediary system of the invention.

The access intermediary base module 301 is configured to receive a resource access request, select a corresponding resource plug-in 303 according to a target resource corresponding to the resource access request, and access the target resource through the selected resource plug-in. As shown in FIG. 4, in this embodiment, the access intermediary base module 301 comprises an access processor 401 and a resource information manager 403, wherein the resource information manager 403 is configured to update an accessible resource list and information of resource plug-ins corresponding to resources in the accessible resource list to form a resource information set 402 (used for storing the accessible resource list and the corresponding relationship between resources and resource plug-ins); and the access processor 401 is configured to receive the resource access request, selects the resource plug-in 303 corresponding to the target resource according to the target source corresponding to the resource access request, a current accessible resource list and the corresponding relationship between resources and resource plug-ins (from the resource information set), and access the target resource through the selected resource plug-in.

Figure 5:
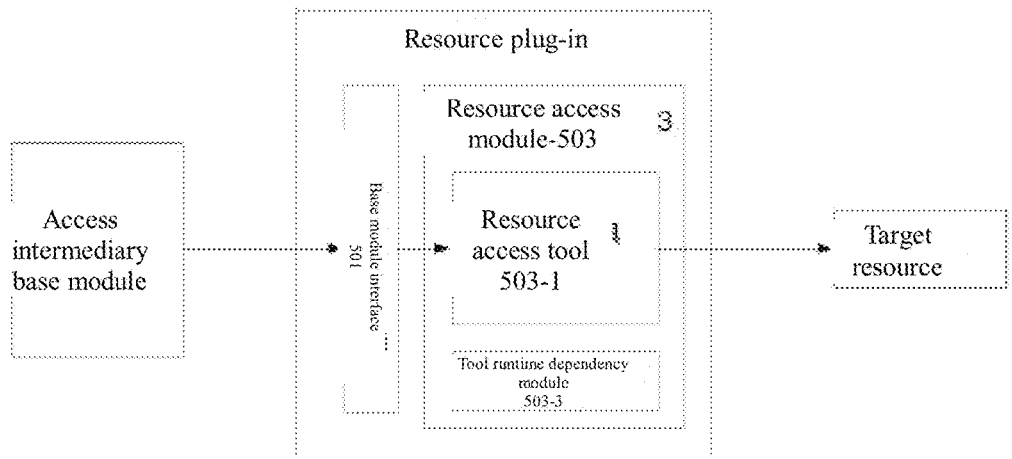
FIG. 5 is a detail diagram of a resource plug-in in the network resource access intermediary system of the invention.

The resource plug-in 303 is configured to adapt to the target resource to complete access to the target resource. As shown in FIG. 5, in this embodiment, the resource plug-in 303 comprises a base module interface 501 and a resource access module 503, wherein the resource access module 503 comprises a resource access tool 503-1 and a tool runtime dependency module 503-3 for providing a corresponding system environment for the operation of the resource access tool, and the resource access tool 503-1 establishes a communication connection with the access processor 401 of the access intermediary base module 301 through the base module interface 501 and is adaptable to the target resource to realize resource access. For example, a resource plug-in adaptable to a word document comprises a tool for opening the word document (such as WPS or Microsoft Office), a system environment for the operation of the tool, and an interface module for communication with the access intermediary base module.

Specifically, when a resource to be accessed is a first target resource on the network (such as a file in a certain format on the network, a webpage, or an application on the network), the access processor 401 acquires information of a resource plug-in required for accessing the first target resource from the resource information set 402 (for example, it may be set that a first resource plug-in is required for accessing the first target resource, and in this case, the resource information set stores the corresponding relationship between the first target resource and the first resource plug-in, and the access processor acquires the information that the first resource plug-in is required for accessing the first target resource according to the corresponding relationship), and transmits the resource access request to the resource access tool 503-1 of the first resource plug-in through the base module interface 501, and the first target resource is accessed through the resource access tool.

By adopting the access intermediary system structure of the invention, when accessing a new target resource (such as a fourth target resource of a new type, a resource plug-in adaptable to the fourth target resource is not available in the current access intermediary system, so users cannot access the fourth target resource through the current access intermediary system), users just need to additionally deploy a resource plug-in adaptable to the new target resource (such as a fourth resource plug-in) to establish an access channel between the access intermediary base module and the target resource and do not need to upgrade an entire access intermediary system like in the prior art, so that the transformation and workload are small, updating is easy, and normal access to original resources will not be affected, thus making the adaptability and stability of the system better. In addition, processing requiring a large quantity of computations such as graphics rendering related to resources to be accessed by users is completed by the network access intermediary system, so that the requirements for the performance of user terminals and for resources are low.

Moreover, when users simultaneously access multiple resources, the resources use corresponding resource plug-ins respectively and are isolated from each other, so that data leakage and security problems caused by resource sharing and data crossover are effectively prevented.

The resource plug-in 303 is also configured to receive a response returned by the target resource;

The access intermediary base module 301 is also configured to acquire the response returned by the target resource from the resource plug-in 303, correspondingly generate a response to a user terminal, and returns the response to the user terminal.

As a preferred solution in specific application, the access intermediary base module 301 is also configured to acquire the response returned by the target resource from the resource plug-in 303, generate information of an image code format, and transmit the information of the image code format to the user terminal as response information; in this way, the response returned by the network resource is projected in real time to obtain the information of the image code format (projected image) which is represented to users through the user terminal, the projected image obtained by the users is consistent with contents obtained when the users directly access the network resource, so that the actual usage experience of the users is not affected. Moreover, the projected image does not contain any actual information (such as the position and composition) of the network resource, so that attackers cannot capture and analyze the information of the network resource by means of an automated tool and cannot launch an effective attack, thus improving the network security. Besides, when users access different resources through user terminals, the user terminals will always obtain a specific type of contents, so that the compatibility between the user terminals and resources is guaranteed essentially.

As a preferred implementation of this embodiment, the network resource access intermediary system further comprises:

A resource plug-in manager 305 which is in a communication connection with the resource information manager 403 and is configured to configure and deploy a new resource plug-in, different from the existing resource plug-in, for the access intermediary system and send information indicating that the new resource plug-in has been deployed to the resource information manager 403, so that the resource information manager 403 is able to update the deployed new resource plug-in and corresponding resource information into the resource information set 402. In actual application, the resource information manager 403 may be also used by an administrator to configure resource information for the access intermediary system; and when a corresponding resource plug-in for the configured resource is not available, the resource information manager 403 sends a request to the resource plug-in manager 305 to request to configure a resource plug-in corresponding to the resource, acquires the resource plug-in from a resource plug-in library 307 (local or online) according to the request, and configures and deploys the resource plug-in. Or, within the optional scope of those skilled in the art, the resource plug-in manager 305 may generate a resource plug-in according to the request and deploy the resource plug-in.

The process of generating a new resource plug-in by the resource plug-in manager 305 may be automatically by a program or be completed manually by a relevant developer or an administrator. The specific program is as follows:

1. A corresponding resource access tool 503-1 is determined according to target resource information;
2. A tool runtime dependency module 503-3 corresponding to the resource access tool, including a basic library file and an operating environment variable, is determined;
3. A base module interface 501 allowing the access intermediary base module to acquire contents provided by the resource access tool is configured; and
4. The resource access tool, the tool runtime dependency module and the base module interface are packaged to support the configuration and deployment by the resource plug-in manager 305, so that a new resource plug-in is obtained.

This embodiment further provides a processing method for a network resource access intermediary system, comprising:

Receiving a resource access request, selecting a corresponding resource plug-in corresponding to a target resource corresponding to the resource access request to adapt to the target resource, and accessing the target resource through the selected resource plug-in.

In this embodiment, the resource access request is received by the access processor 401 of the network resource access intermediary system based on resource plug-ins; the resource plug-in corresponding to the target resource is selected according to the target resource corresponding to the resource access request, an accessible resource list and a corresponding relationship between resources and resource plug-ins (from the resource information set); and a resource access tool 503-1 in the selected resource plug-in establishes a communication connection with the access processor 401 through a base module interface 501 and is adaptable to the target resource, and the target resource is accessed through the selected resource plug-in.

As a preferred implementation of this embodiment,

The processing method further comprises: receiving a response returned by the target resource, correspondingly generating a response to a user terminal, and transmitting the response to the user terminal. In this embodiment, the resource plug-in receives the response returned by the target resource, and the access intermediary base module acquires the response returned by the target resource from the resource plug-in and transmits the response to the user terminal.

In actual application, the access intermediary base module is also used for acquiring the response returned by the target resource from the resource plug-in, generating information of an image code format, and transmitting the information of the image code format to the user terminal as response information; in this way, the response returned by the network resource is projected in real time to obtain the information of the image code format (projected image) which is represented to users through the user terminal, the projected image obtained by the users is consistent with contents obtained when the users directly access the network resource, so that the actual usage experience of the users is not affected. Moreover, the projected image does not contain any actual information (such as position and composition) of the network resource, so that attackers cannot capture and analyze the information of the network resource by means of an automated tool and cannot launch an effective attack, thus improving the network security. Besides, when users access different resources through user terminals, the user terminals will always obtain a specific type of contents, so that the compatibility between the user terminals and resources is guaranteed essentially.

What is claimed is:

1. A processing method for a network resource access intermediary system, comprising the following steps:

receiving a resource access request from a user terminal requesting a target resource in a network, selecting a corresponding resource plug-in according to the target resource corresponding to the resource access request to adapt to the target resource, establishing an access channel between the network resource access intermediary system and the target resource using the selected resource plug-in, and accessing the target resource through the selected resource plug-in; and packaging a resource access tool, a tool runtime dependency module for providing a corresponding system environment for operation of the resource access tool, and a base module interface for realizing a communication connection between the resource access tool and an access intermediary base module to obtain the resource plug-in;

wherein selecting the corresponding resource plug-in according to the target resource corresponding to the resource access request specifically comprises:

selecting the resource plug-in corresponding to the target resource according to the target resource corresponding to the resource access request, a current accessible resource list and a corresponding relationship between resources and resource plug-ins:

wherein the method further comprises:

receiving a first response returned by the target resource via the resource plug-in, correspondingly generating a second response to a user terminal, and transmitting the second response to the user terminal.

* * * * *